United States Patent
Magielse et al.

(10) Patent No.: US 10,455,666 B2
(45) Date of Patent: Oct. 22, 2019

(54) LIGHTING CONTROL

(71) Applicant: SIGNIFY HOLDING B.V., Eindhoven (NL)

(72) Inventors: Remco Magielse, Tilburg (NL); Hugo José Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/324,611

(22) PCT Filed: Jul. 21, 2017

(86) PCT No.: PCT/EP2017/068523
§ 371 (c)(1),
(2) Date: Feb. 11, 2019

(87) PCT Pub. No.: WO2018/028973
PCT Pub. Date: Feb. 15, 2018

(65) Prior Publication Data
US 2019/0191529 A1    Jun. 20, 2019

(30) Foreign Application Priority Data
Aug. 10, 2016 (EP) ..................... 16183577

(51) Int. Cl.
*H05B 37/02* (2006.01)
(52) U.S. Cl.
CPC ..... *H05B 37/0227* (2013.01); *H05B 37/0245* (2013.01)

(58) Field of Classification Search
CPC .. H05B 37/02; H05B 37/029; H05B 37/0227; H05B 37/0272; H05B 33/0845;
(Continued)

(56) References Cited

U.S. PATENT DOCUMENTS

| 7,804,417 B2 | 9/2010 | Fujikawa et al. |
| 8,798,316 B2 | 8/2014 | Berkvens |

(Continued)

FOREIGN PATENT DOCUMENTS

| WO | 2009004539 A1 | 1/2009 |
| WO | 2015063644 A1 | 5/2015 |

(Continued)

*Primary Examiner* — Haissa Philogene
(74) *Attorney, Agent, or Firm* — Meenakshy Chakravorty

(57) ABSTRACT

A method of controlling a lighting system, the method comprising: receiving a user input from a user; controlling a first plurality of luminaires in a first environment to render a lighting scene in response to the received user input; storing at least one parameter of the lighting scene in electronic storage; detecting a presence of the user in a second environment and in response thereto: determining at least one property of the second environment and/or the user in the second environment; determining whether the determined property meets one or more predetermined criteria; and using the stored parameter to control a second plurality of luminaires in the second environment to render a version of the lighting scene on condition that the one or more predetermined criteria are determined to be met; wherein the at least one property comprises a duration of the presence of the user in the second environment, and the one or more predetermined criteria comprise a criterion of the duration of the presence of the user in the second environment exceeding a threshold duration.

12 Claims, 3 Drawing Sheets

(58) Field of Classification Search
CPC ............ H05B 33/0854; H05B 33/0872; H05B 33/0863; Y02B 20/44; Y02B 20/46; Y02B 20/48; G06F 1/1694
See application file for complete search history.

(56) References Cited

U.S. PATENT DOCUMENTS

| | | | |
|---|---|---|---|
| 8,896,414 B2* | 11/2014 | Vinkenvleugel ... | H05B 37/0272 340/4.11 |
| 9,137,878 B2 | 9/2015 | Thompson | |
| 9,936,556 B2* | 4/2018 | Chraibi ............. | H05B 33/0845 |
| 9,942,967 B2* | 4/2018 | Chraibi ............. | H05B 37/0227 |
| 2010/0213876 A1 | 8/2010 | Adamson et al. | |
| 2018/0098408 A1* | 4/2018 | Hubbers ............ | H05B 37/0227 |
| 2019/0124745 A1* | 4/2019 | Mason ................ | H05B 37/029 |
| 2019/0174606 A1* | 6/2019 | Magielse ............ | H05B 37/029 |

FOREIGN PATENT DOCUMENTS

| | | | |
|---|---|---|---|
| WO | 2015176953 A1 | 11/2015 | |
| WO | 2016019005 A1 | 2/2016 | |

\* cited by examiner

LIGHTING CONTROL

CROSS-REFERENCE TO PRIOR APPLICATIONS

This application is the U.S. National Phase application under 35 U.S.C. § 371 of International Application No. PCT/EP2017/068523, filed on Jul. 21, 2017, which claims the benefit of European Patent Application No. 16183577.2, filed on Aug. 10, 2016. These applications are hereby incorporated by reference herein.

TECHNICAL FIELD

The present disclosure relates to systems and methods for controlling luminaires, i.e. lighting devices, to render a lighting scene in an environment.

BACKGROUND

WO2015/063644A1 discloses a lighting unit configured for tracking the time of day and/or as sensing ambient light conditions and adjusting the intensity and/or color temperature of its light source accordingly.

US2010/213876A1 discloses method for controlling a plurality of lights by receiving information from a data tag (e.g. RFID tag). This data is indicative of lighting settings for a plurality of lights which are controlled in accordance with the received lighting settings Electronic devices are becoming ever more connected. A "connected" device refers to a device—such as a user terminal, or home or office appliance or the like—that is connected to one or more other such devices via a wireless or wired connection in order allow more possibilities for control of the device. For instance, the device in question is often connected to the one or more other devices as part of a wired or wireless network, such as a Wi-Fi, ZigBee or Bluetooth network. The connection may for example allow control of the device from one of the one or more other devices, e.g. from an app (application) running on a user device such as a smart phone, tablet or laptop; and/or may allow for sharing of sensor information or other data between the devices in order to provide more intelligent and/or distributed automated control.

In recent years, the number of connected devices has increased dramatically. Lighting systems are part of this movement towards a connected infrastructure. Conventional connected lighting systems consist of fixed light sources, which can be controlled through wall-mounted switches, dimmers or more advanced control panels that have preprogrammed settings and effects, or even from an app running on a user terminal such as a smart phone, tablet or laptop. For example, this may allow user to create an ambiance using a wide range of colored lighting, dimming options and/or dynamic effects. In terms of control the most common approach is to replace a light switch with a smartphone based app that offers extended control over lighting (for example Philips hue, LIFX, etc.).

A lighting scene is a particular overall lighting effect in an environment rendered by the light sources in that environment. E.g. a "sunset" scene may be defined in which the light sources are set to output hues in the red-yellow range of the visible spectrum. Each light source may for example output the different hues (or other setting such as saturation or intensity), or a scene may be rendered by all (or some) lights rendering a single color or similar colors. Note that lighting scenes may be dynamic in that the output of one or more light source changes over time.

Connected lighting systems are able to render lighting scenes by receiving lighting instructions over the network (e.g. a ZigBee network) from, for example, a user device such as a smart phone, and interpret the lighting instructions in order to determine the appropriate lighting settings for each light source in order that the lighting system renders a desired lighting scene in the environment.

SUMMARY

The environment may be a user's house or home. In this case the lighting system may span several "sub-environments" such as the rooms of the house. The user of the lighting system may wish to implement a given scene in one room at one point in time and then the same scene in a different room at a later point in time. This behavior is generally called "follow me" behavior.

There are many descriptions and concepts available for automated "follow me" behavior for light settings. "Follow me" behavior implies that the user recalls light settings once, and wherever the user goes in his house, the light settings follow him. For example: the user has a scene based on his favorite holiday picture in the Living Room. When he moves to his Study room the light settings change to match the favorite holiday picture.

Current technologies for implementing "follow me" behaviors are susceptible to false positives (switching to a desired scene when the user does not want it) and false negatives (not switching to a scene as the user expected it to happen). This is largely due to a problem that it is difficult for the system to determine when light settings have to move to another location.

The present invention solves this problem by providing conditional follow me behavior, which is effected only if one or more predetermined criteria are met.

In embodiments, this can be based for example on presence duration and/or the type of room that the user is in. It may be further based on the amount of motion that is detected in the room which may help in reducing false positives/negatives.

According to a first aspect disclosed herein, there is provided a method of controlling a lighting system, the method comprising: receiving a user input from a user; controlling a first plurality of luminaires in a first environment to render a lighting scene in response to the received user input; storing at least one parameter of the lighting scene in electronic storage; detecting a presence of the user in a second environment and in response thereto: determining at least one property of the second environment and/or the user in the second environment; determining whether the determined property meets one or more predetermined criteria; and using the stored parameter to control a second plurality of luminaires in the second environment to render a version of the lighting scene on condition that the one or more predetermined criteria are determined to be met.

In embodiments, the at least one property comprises a duration of the presence of the user in the second environment, and the one or more predetermined criteria comprise a criterion of the duration of the presence of the user in the second environment exceeding a threshold duration.

In embodiments the at least one property comprises a type of the second environment, and the one or more predetermined criteria comprise a criterion of the type of the second environment being a scene-rendering type.

In embodiments both the duration of the presence of the user in the second environment and the room type of the second environment are determined, and the second plurality of luminaires are controlled to render the version of the lighting scene on condition that both the duration exceeds the threshold duration and the type is a scene-rendering type.

In embodiments the method further comprises determining at least one property of the presence of the user in the second environment; determining whether the at least one property of the presence of the user in the second environment meets one or more criteria; and wherein said controlling the second plurality of luminaires is performed on further condition that the determined at least one property of the presence of the user in the second environment is determined to meet the one or more criteria.

In embodiments said at least one property of the presence of the user in the second environment comprises a speed of the user within the second environment, and wherein said one or more criteria comprise a criterion being that the speed of the user is below a predetermined threshold speed.

In embodiments said at least one property of the presence of the user in the second environment comprises an amount of motion of the user within the second environment, and wherein said one or more criteria comprise a criterion being that the amount of motion of the user is below a predetermined threshold amount of motion.

In embodiments the method further comprises determining a first ID being an ID of the user from whom the user input is received; determining a second ID being an ID of the user whose presence is detected in the second environment; determining whether the second ID matches the first ID; and wherein said controlling the second plurality of luminaires is performed on further condition that the second ID is determined to match the first ID.

In embodiments the method further comprises controlling the first plurality of luminaires to turn off in response to said detecting a presence of the user in a second environment.

In embodiments the type of the second environment is configured by the user.

In embodiments the threshold duration is configured by the user.

In embodiments the threshold speed is configured by the user.

In embodiments the threshold amount of motion is configured by the user.

According to another aspect disclosed herein, there is provided a computer program product comprising code stored on a computer-readable storage medium and configured so as when executed to implement the method according to any of the embodiments disclosed herein.

According to another aspect disclosed herein, there is provided a lighting system comprising: a first plurality of luminaires arranged to provide illumination in a first environment; a second plurality of luminaires arranged to provide illumination in a second environment; and a controller arranged to: receive a user input from a user; control the first plurality of luminaires render a lighting scene in response to the received user input; store at least one parameter of the lighting scene in electronic storage; detect a presence of the user in the second environment and in response thereto: determine at least one property of the second environment and/or the user in the second environment; determine whether the determined property meets one or more predetermined criteria; and use the stored parameter to control a second plurality of luminaires in the second environment to render a version of the lighting scene on condition that the one or more predetermined criteria are determined to be met.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
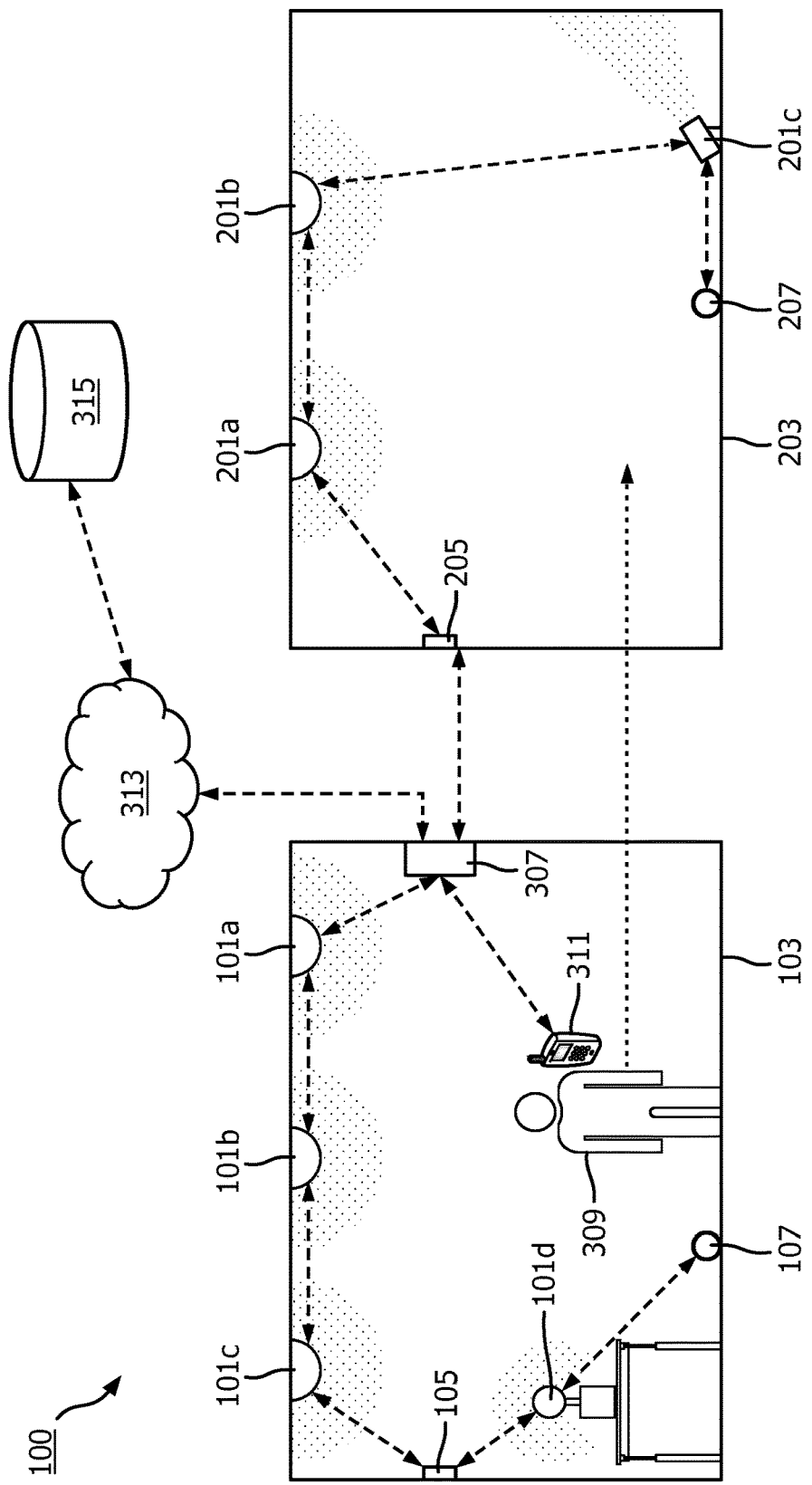
FIG. 1 shows a system according to embodiments of the present invention.

The described embodiments of the present invention relate to an improvement of "follow me" effects by lighting systems known in the art. In the present invention, a follow me effect from a source room (a first environment) to a destination room (a second environment) is implemented by determining at least one property of the second environment and/or the user in the second environment.

The at least one property may be a duration of a presence of the user in the second environment, in which case the follow me behavior is implemented under the condition that the user stays in the room for a (predefined) period of time.

The at least one property may be a room type of the second environment, in which case the follow me behavior is implemented under the condition that the room is marked as 'living area', which indicates that people use scenes in this space. That is, there are at least two room types, being a scene-rendering type and non-scene-rendering type. A scene-rendering type room (also called "living area", "valid" or "valid scene area") is a room in which a user would like a lighting scene to follow him. A non-scene-rendering type room (also called a "transitional area", "invalid" or "invalid scene area") on the other hand is a room in which the user would prefer the lighting scene not be rendered just by them moving into that room, or a room which is marked as such because it is incapable of rendering scenes (e.g. it only contains white bulbs, and the user wanted to have a rainbow scene follow him).

In order to implement these conditions, the lighting system of the present invention is provided with detectors/sensors and also a means of knowing the type of each room the system covers. That is, the following information is available in the lighting system:

Light sources are aware of which room they are in. Each room is provided by a room type (e.g., Living Room, Kitchen, Hallway, Garage, etc.)

A set of capabilities of the light sources in each room. This allows the system to determine whether or not a given scene can be rendered in each room. E.g. a room containing only white light sources is unable to render a "sunset" effect as the sunset effect requires red/orange/yellow hues.

A motion/presence/activity sensor, camera, or RF beaconing system in the rooms to which the user wants to apply the effect.

For a single user the system can also determine the source and the destination room. For example, this may be done based on the order that motion sensors trigger in the 'source' and 'destination' room respectively. If a user is in one room, motion will first be detected in that room—making it the 'source'. If motion is detected in another room, or a series of rooms, the last room in which motion is detected can be qualified as the 'destination'.

To enhance this decision, additional criteria can be evaluated:

If motion is no longer detected in a room it cannot be the 'destination' room

If the room does not have a 'scene' activated, but default light settings—it is not necessary to copy light settings The above criteria are particularly advantageous in that they can help to prevent false positives. For example. If the user is in the living room and has been either detected moving around or making changes to the settings in the living room, then when he moves from living room to kitchen the algorithm according to the present invention will take effect; if these conditions are not met in the living room then at the very least the settings of the living room will not be used for the follow me effect.

In order for the light effect to be implemented, the destination room's light sources need to be able to support that scene (i.e. at least render that same effect with at least part of the existing light sources, such that the overall ambiance is considered the same by the user). For example, a lighting scene may be rendered in a first room based on a picture by controlling each luminaire in a room to render a random color value from the picture. A second room can render the "same" lighting scene simply by using the same picture as the source for a new set of random color values to be applied to the luminaires in the second room. In this sense, the first and second rooms may render slightly different colors for each luminaire (and also note that the two rooms may have different numbers and/or arrangements of luminaires) but the user will experience substantially the same lighting scene effect as the same color palette (picture) has been used to generate the scene.

The present invention advantageously works to avoid taking light settings from a room a user has been controlling remotely, e.g. a user may be in the living room but controlling a scene in a bedroom, in which case when the user walks into the kitchen he likely does not want the bedroom's scene to be applied to the kitchen. This can be determined by a lack of motion detection in the bedroom by a sensor. If there are multiple users present, a more sophisticated motion sensor such as at least one cameras or RF beacons reading smart devices may be required to determine which user is present in which room, thus allowing the system to determine that the user with the control device is present in the living room not the bedroom, even if there is motion detected in the bedroom (i.e. another user).

With a camera it is possible to identify individual users. This also allows the system to avoid false positives. E.g. if a first user changes the lights in the living room and then a second user goes to the kitchen, the scene from the living room will not follow the second user because the system will know that the first user triggered the last action (in the living room) and the second user entered the kitchen.

With RF beacons it is possible to detect a specific fingerprint or RF signature of e.g. a smartphone or smartwatch such that when a user enters a room the system identifies that user (e.g. by a user ID) and not somebody else (i.e. a different user having a different user ID) entering. This allows the system to determine that the light effects should indeed follow the user.

FIG. 1 shows a system 100 according to embodiments of the present invention. A first environment 103 contains a first plurality of luminaires 101a-d and a first switch 105. Luminaires 101a-c are ceiling type luminaires designed to provide illumination in the first environment 103 from above. Luminaire 101d is a free-standing lamp type luminaire placed on a table designed to provide illumination in the first environment 103 from a lower position than the ceiling type luminaires 101a-c. Each of the luminaires 101a-d may be any suitable type of luminaire such as an incandescent light, a fluorescent light, an LED lighting device etc. The plurality of luminaires 101a-d may comprise more than one type of luminaire, or each luminaire 101a-d may be of the same type.

The first switch 105 is shown in FIG. 1 as a wall-mounted switch and may be any suitable type of switch allowing user input to control the first plurality of luminaires 101a-d. For example, the first switch 105 may be a simple on-off controller switch or may allow for more complex control such as dimming and possibly even control of individual lighting characteristics such as hue and saturation. The first switch 105 may also be a portable switch (portable remote control) capable of being moved from one environment to another. The term "switch" is used herein to refer to any control device allowing a user to input commands into the lighting system.

Similarly, a second environment 203 contains a second plurality of luminaires 201a-c and a second switch 205. Luminaires 201a-b are ceiling type luminaires designed to provide illumination in the second environment 203 from above. Luminaire 201c is wall-washer type luminaire placed on the floor of the second environment 203 and arranged to provide illumination in the second environment 203 by illuminating a wall of the second environment 203. Again, each of the luminaires 201a-s may be any suitable type of luminaire such as an incandescent light, a fluorescent light, an LED lighting device etc. The second plurality of luminaires 201a-c may comprise more than one type of luminaire, or each luminaire 201a-c may be of the same type.

The second switch 205 is shown in FIG. 1 as a wall-mounted switch and may be any suitable type of switch allowing user input to control the first plurality of luminaires 201a-d. For example, the second switch 205 may be a simple on-off controller switch or may allow for more complex control such as dimming and possibly even control of individual lighting characteristics such as hue and saturation. The first switch 105 may also be a portable switch (portable remote control) capable of being moved from one environment to another.

The first plurality of luminaires 101a-d, the first switch 105, the second plurality of luminaires 201a-c and the second switch 205 along with a lighting bridge 307 form a connected lighting network. That is, they are all interconnected by wired and/or wireless connections, indicated by dotted lines in FIG. 1. In particular, FIG. 1 shows "chaining" connections such as may be implemented in a ZigBee lighting network, wherein it is not necessary for each device to be directly connected to each other device. Instead, devices are able to relay communication signals which allows for, for example, luminaire 101c to communicate with the lighting bridge 307 by relaying data through luminaires 101b and 101c to lighting bridge 307. However, it is not excluded that other network topologies may be employed. For example, a "hub-and-spoke" topology may be used in which each device is directly connected (e.g. wirelessly) to the lighting bridge 307 and not to any other devices in the network.

As another example, each luminaire in the network may be configured according to one communication protocol, such as ZigBee, and the switches may be configured according to another communication protocol, such as WiFi. Hence, it is appreciated that the luminaires may communicate with each other and the lighting bridge 307 without relaying data through a switch as shown in FIG. 1, and the switches 105, 205 may communicate directly with the lighting bridge 307. In any case, it is understood that the lighting bridge 307 is able to communicate, by whatever appropriate means, with each other device in the lighting network.

Lighting bridge 307 is arranged at least to receive input (e.g. from switches 105, 205) and to send lighting control commands to luminaires 101a-d, 201a-c.

FIG. 1 also shows a user 309 and user device 311 such as a smart phone. The user device 311 is operatively coupled to the lighting bridge 307 by a wired or wireless connection (e.g. WiFi or ZigBee) and hence forms part of the lighting network. User 209 can provide user input to the lighting bridge 307 via the user device 311 using, for example, a graphical user interface of the user device 311. The lighting bridge 307 then interprets the user input and sends control commands to the luminaires 101a-d, 201a-c accordingly. As mentioned above, the user device 311 generally allows for more complex control than the switches 105, 205. For example, the user 309 may use the user device 311 to control an individual luminaire. In general it is desirable for each switch to control the luminaires in the same environment as the switch itself, i.e. in FIG. 1 switch 105 controls only luminaires 101a-d and switch 205 controls only luminaires 201a-c, but the user device 311 may control any luminaire at all within the lighting network. For example, the user 309 may use the user device 311 to control a luminaire in another environment, such as controlling a luminaire in a different room other than the room in which the user 309 and user device 311 are currently.

This is particularly advantageous because the user device 311 is generally more portable than a switch (particularly a wall-mounted switch), and hence may be used at different physical locations. The user device 311 may be used to control the first and/or second plurality of luminaires to render a lighting scene, e.g. by the user 309 selecting the lighting scene and desired luminaires using a GUI of the user device 311.

As illustrated in FIG. 1, lighting bridge 307 may also be provided with a wide area network (WAN) connection such as a connection to the internet 313. This connection, as known in the art, allows the lighting bridge 307 to connect to external data and services such as memory 315. Note that the wireless connection between user device 311 and the lighting bridge 307 is shown in FIG. 1 as a direct connection, but it is understood that the user device 311 may also connect to the lighting bridge 307 via the internet 313.

A first sensor 107 is present within the first environment 103 and is arranged to detect the presence of users within the first environment 103. Similarly, a second sensor 207 is present within the second environment 203 and is arranged to detect the presence of users within the second environment 203. The first sensor 107 and second sensor 207 are part of the lighting network in that they are arranged to communicate with the network via a wired or wireless connection. That is, the first sensor 107 and the second sensor 207 are arranged to at least be operatively coupled to the lighting bridge 307.

Although shown in FIG. 1 as single entities, it is understood that any suitable sensor or plurality of sensors may be used to provide the functionality ascribed herein to the first sensor 107 (and similarly the second sensor 207). For example, the first sensor 107 may comprise a sensor arranged to detect the presence of users directly, such as a near infra-red sensor, a camera, an ultrasonic sensor, or other sensors known in the art. As a further example, the first sensor 107 may comprise a sensor arranged to detect the presence of users indirectly, e.g. by detecting the presence and/or location of a user device 311 carried by the user. In this case, the first sensor 107 may comprise a plurality of signaling beacons arranged to communicate with the user device 311 to determine its location, as known in the art. Similarly comments to the above apply in relation to the second sensor 207. In either case, a single sensor may be arranged to detect the presence of the user 309 in both the first environment 103 and the second environment 203, in which case it is understood that the second sensor 207 is not required.

In operation, the first plurality of luminaires 101a-d are rendering a lighting scene. User 309 may have controlled the luminaires 101a-d via the lighting bridge 307 using his user device 301 (or by switch 105) to render the lighting scene, or the lighting scene may have been automatically triggered by, for example, detection of the presence of user 309 by the first presence sensor 107, or by a timer. The second plurality of luminaires 201a-c may or may not also be rendering a (possibly different) lighting scene.

In any case, when the user 309 moves to the second environment 203 he may wish for the lighting scene to follow him to the second environment 203. As mentioned above, this is generally called "follow me" behavior in the art. To do so, the system must be able to detect at least the presence of the user 309 within the second environment 203. Methods for doing so are well known in the art and so only described briefly here. For example, as mentioned above each environment may have a presence sensor arranged to detect the presence of a person within that respective environment using, e.g. infrared motion detection (e.g. a passive infrared PIR sensor), or a camera etc. Alternatively or additionally, the location of the user device 311 may be used as an indication of the location of the user 309. The location of the user device 311 may be determined using signals sent between the user device 311 and at least one beacon node which may be for example, in the case of GPS, at least one satellite, but may also be at least one local beacon node forming part of a local network such as a Bluetooth beaconing network (not shown in FIG. 1).

Figure 2:
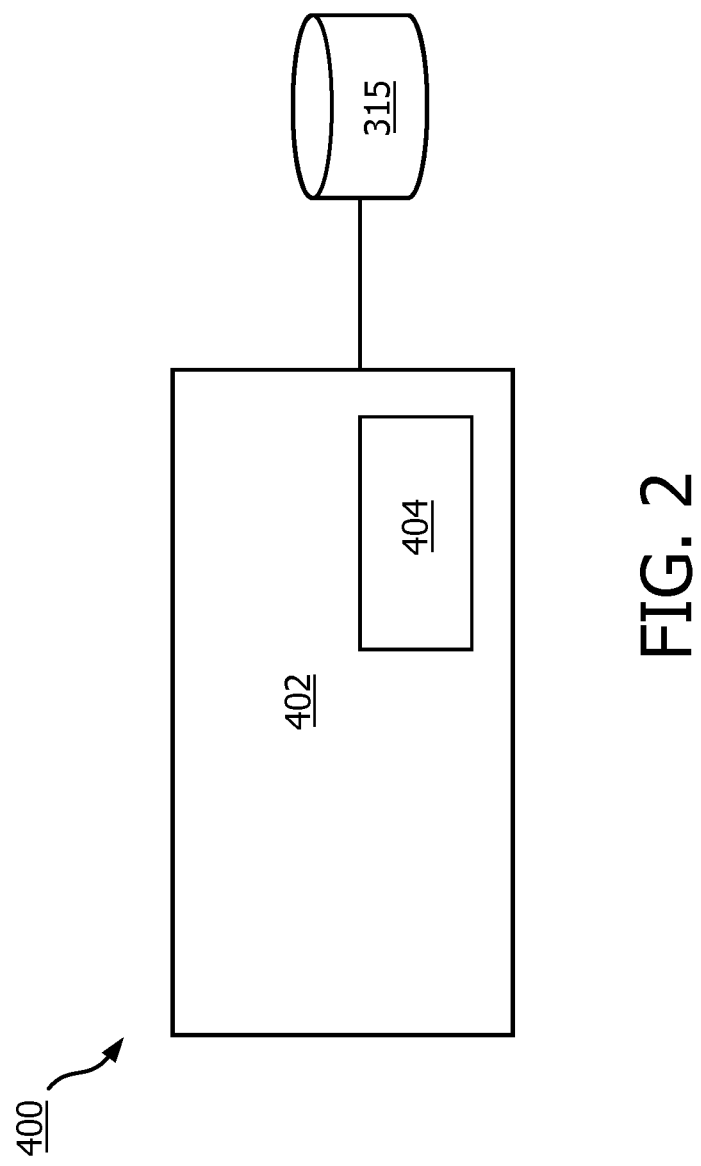
FIG. 2 is a functional block diagram of a controller according to embodiments of the present invention.

FIG. 2 shows a functional block diagram of a controller 400. The controller 400 is a functional block providing the functionality described herein, and the controller 400 may be implemented solely in hardware, software, or in a combination of hardware and software. Hence, it is understood that FIG. 2 is for the purposes of illustration only. FIG. 2 shows the controller 400 as comprising code 404 running on at least one processor 402. That is, it is understood that the controller 400 shown in FIG. 2 represent a functional block which is implemented in the lighting system 100 shown in FIG. 1. For example, the controller 400 may be implemented in the lighting bridge 307, one of the first plurality of luminaires 101a-d, one of the second plurality of luminaires 201a-c, the first switch 105, the second switch 205, the first sensor 107, the second sensor 207, or the user device 311. It is also understood that the controller 400 may be implemented in a distributed manner with some functionality being implemented in one entity of the lighting system (as mentioned above) and other functionality implemented in one or more other entities of the lighting system.

Figure 3:
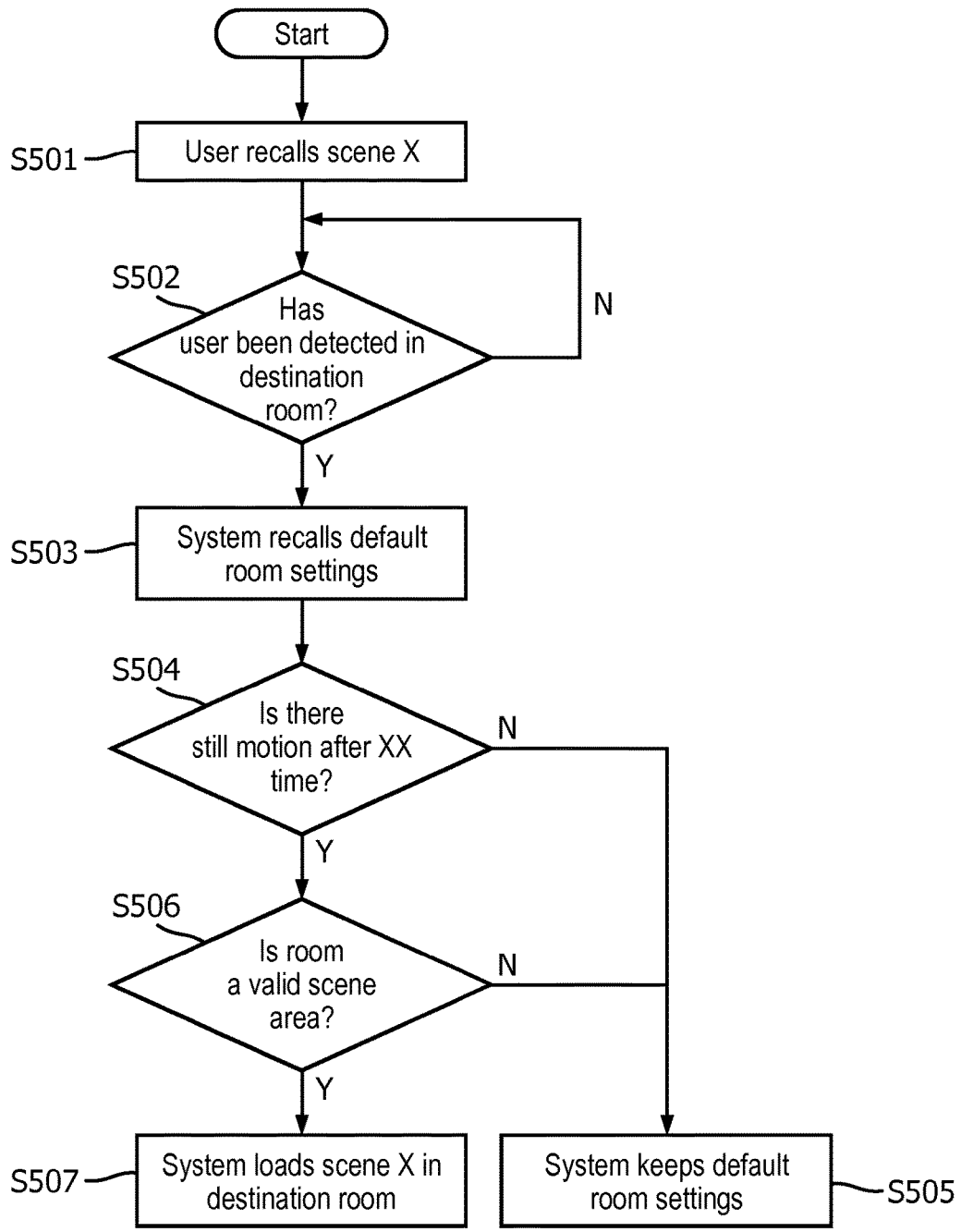
FIG. 3 is a method performed by the controller in accordance with embodiments of the present invention.

FIG. 3 is a flow diagram of a method implemented by the controller 400 in accordance with embodiments of the present invention.

At step S501, the user 309 recalls a scene ("scene X") in the first environment 103. Note that this step may have been performed at any previous time. In this sense, the scene may be considered as already having been rendered at the start of the method.

At step S502, the controller 400 determines whether the user 309 has been detected in the second environment 203, which may be called a "destination" environment such as a destination room in a building. However, note that the controller 400 does not know which room will be the destination room for the lighting scene before the user 309 is detected there. To do so, the controller 400 may periodically poll the location of the user 309, or the system may provide an alert when the location of the user 309 is within the second environment 203. Either way, if the user is not detected in the second environment 203, the system waits.

In general there are two options: the controller 400 can detect that there are users (but not know which ones), or it can both detect and identify the users. In the first case, a simple trigger by the sensor is enough to conclude that the system should go forward to step S503. In the second case, an additional step is needed where upon detection of a new destination room the controller 400 needs to verify whether the user that triggered presence/motion in the second environment 203 is the same user that initiated the lighting scene in the first environment 103.

Once the user 309 is detected in the second environment 203, the controller 400, at step S503, recalls default room settings and controls the second plurality of luminaires 201a-c to illuminate the second environment 203 in accordance with the default settings. For example, the default settings may be a bright white light designed only to allow the user 309 to see in the second environment 203, rather than a more complex scene designed to provide an ambiance, though this is not excluded. Note that this step is optional. For example, the controller 400 may determine that the luminaires in the second environment 203 are already providing sufficient illumination (e.g. as the controller 400 has access to the current settings of each luminaire, or via an ambient light sensor in the second environment 203). In this case, the controller 400 may perform step S503 only when necessary, e.g. if the ambient light in the second environment 203 is below a threshold indicating that the second environment is not sufficiently illuminated.

At step S504, the controller 400 determines whether the user 309 remains in the second environment 203. This can be done by determining whether the user's location remains within the second environment 203 for a predetermined amount of time (e.g. 20 seconds). Optionally, the controller 400 can also determine the amount of motion or speed of the user within the second environment 203 and take this into account (e.g. rendering the lighting scene only if the amount of motion or speed are determined to be below a threshold amount). For example, it might be the case that some users move very fast around a room because they are searching for something and it is taking them long and would therefore not be interested in having the scene follow them. For example, this can be done using a camera as the second sensor 207, with which it is possible to determine how fast the user is moving within its field of view, and as such can conclude whether this new parameter should be used too.

If it is determined that the user 309 has not remained in the second environment 203 for longer than a threshold time, then the method proceeds to step S505 wherein the default lighting settings in the second environment 203 applied by the controller in step S503 are maintained. Alternatively, the controller 400 could control the second plurality of luminaires 201a-c differently, e.g. to turn off, or if they were rendering a scene prior to the user 209 entering the second environment 203 then to return to rendering that scene.

If instead the controller 400 determines that the user 309 has remained in the second environment 203 for longer than the threshold time, then the method proceeds to step S506 wherein the controller 400 checks that the second environment 203 is a valid scene area. As mentioned above, each environment (e.g. each room of a house) can be "tagged" with a "room type" (e.g., Living Room, Kitchen, Hallway, Garage, etc.). Some of these room types are "valid" and some are not. A room is of a valid room type if the room is a room which exhibits follow me behavior. That is, as a user moves from one room to another, the lighting scene will only follow him to the second room if the second room is a valid room type. This has the advantage that some rooms within a lighting system are only transitionary in nature. For example, people do not tend to spend much time carrying out tasks in a corridor. The corridor can then be tagged as an invalid room which means that the system according to the present invention will provide illumination as the user passes through the corridor, but will not render the follow me lighting scene until the user has actually reached their destination (e.g. the kitchen).

An environment may also be considered "invalid" if it is simply incapable of rendering a given lighting scene. Hence, it is understood that whether or not a scene is valid depends on the particular lighting scene to be rendered in the second environment 203. For example, an environment containing only luminaires capable of rendering red/orange hues may be "valid" with respect to a "sunset" scene but "invalid" with respect to a "rainbow" scene as the luminaires cannot render the full spectrum required for the rainbow scene. If the second environment 203 is determined to be invalid, the light settings therein should be kept as default by the controller 400.

In any case, the user 309 may be able to override the "labels" tagging each environment as valid or invalid, e.g. using his user device 311 to change the labels stored in memory 315. This is advantageous in that the user 309 is then able to specify their own personal preferences, e.g. they may not want scenes to follow them into a particular room such as a bathroom.

If the controller 400 determines that the second environment 203 is a valid scene area then it controls the second plurality of luminaires 201a-c to render the lighting scene in the second environment, hence enacting the follow me behavior (the lighting scene has now followed the user 309 from the first environment 103 to the second environment 203).

If the controller 400 determines, at step S506, that the second environment 203 is not a valid room type, then the controller 400 proceeds to step S505, as described above.

Note that the steps shown in the method of FIG. 3 may be performed in any order. For example, it may be advantageous to perform step S506 first in order to quickly determine whether or not the second environment 203 is a valid room type.

Below are three example scenarios for the purposes of explanation only, aimed at giving a better understanding of the advantages of the present invention.

Scenario 1—Following the User

In a first scenario, the first environment 103 is the living room of a house and the second environment 203 is the kitchen of the house.

To begin, the user is in the living room and has a "sunset" scene active (colors: red, orange, yellow), being rendered by the luminaires in the living room. The user then gets up and walks to the kitchen to have breakfast. To get to the kitchen, the user must walk through a hallway.

As he passed through the hallway the controller determines (e.g. via a motion sensor in the hallway) that the user is now in the hallway area, and that the hallway type should not take part in "follow me" behavior as this is a transitional area (i.e. the hallway is not a valid room type for follow me behavior). Nonetheless, the controller turns the light to a default setting so that the user can see to navigate within the hallway area.

The user enters the kitchen, and the controller determines that the user is in the kitchen for example using a motion sensor in the kitchen, and turns on the kitchen lights to a default setting. Again, this default setting may be designed only to illuminate the environment (e.g. bright white light) rather than to provide an ambiance (e.g. a sunset scene).

The user then proceeds to sit down and have breakfast in the kitchen. The controller, via the motion sensor, detects that the user stays in the kitchen (i.e. for more than a predetermined amount of time) and also determines that the kitchen is marked as area where scenes may be used (i.e. the kitchen is a valid scene area). Thus, the controller controls the luminaires in the kitchen to transition to the scene of the previous room (i.e. the "sunset" scene from the living room).

The predetermined amount of time may be configurable by the user.

Scenario 2—Avoiding False Positives

In a second scenario, the user is in the living room reading a book. He has controlled the luminaires in the living room to render a "sunset" scene (colors: red, orange, yellow).

The user then gets up and walks over to the kitchen to get a drink. As in the first scenario, the user may or may not pass through other rooms on the way to the kitchen, such as a hallway.

The controller, via a motion sensor in the kitchen, detects the user in the kitchen and turns on the lights to a default settings (e.g. bright white light).

The user takes his drink and heads back to the living room. The controller determines that the user was active for less than a predetermined amount of time (e.g. 1 minute) in the kitchen and therefore does not change the lighting settings in the kitchen to the "sunset" scene. I.e. the system does not implement the follow me behavior from the living room to the kitchen.

Whether or not the sunset scene follows the user or not (not, in this scenario) does not imply that the scene should be removed automatically from previous rooms (the living room, in this scenario). That is, "both cut-and-paste" and "copy-and-paste" methods are equally valid. In this case, it may be advantageous to continue rendering the scene in the living room such that when the user then returns to the living room he finds the "sunset" scene is still active. This is advantageous because the user only moved to the kitchen for a brief period of time. The present invention is thus able to recognize that although the user has moved to another room the user would prefer the follow me behavior to not be enacted.

Scenario 3—Do Not Deploy in Invalid Rooms

In a third scenario, the user is in the living room reading a book. He has a "sunset" scene active (colors: red, orange, yellow).

The user gets up and walks to a service room to do the laundry. The controller detects, via a motion sensor in the service room that the user in the service room and turns on the lights in the service room to a default setting (e.g. bright white light).

The user spends some time operating the washing machine which exceeds the threshold time and thus would normally have triggered the controller to render the sunset scene in the service room. However, the laundry is tagged as a room where scenes are not meant to be applied, and thus the controller ignores that input and remains with the default setting in the service room. Preferably, the controller also determines when the user has left the service room and turns the lights off in response thereto.

The user then returns to the living room to find the "sunset" scene is still active in the living room. This is advantageous because the user may consider the sunset scene to be inappropriate lighting for doing laundry. The present invention is thus able to recognize that although the user has moved to another room the user would prefer the follow me behavior to not be enacted.

It will be appreciated that the above embodiments have been described only by way of example. Other variations to the disclosed embodiments can be understood and effected by those skilled in the art in practicing the claimed invention, from a study of the drawings, the disclosure, and the appended claims.

For example, the amount of motion within the second environment 203 can be taken into account. If there is a lot of motion, the follow me effect will not be triggered. If the amount of motion in the room is low then the room will transition to the scene. This is advantageous in that the system waits for the user to "settle down" before moving the lighting scene, which can help avoid false positives.

If there are multiple users present, it may be difficult to reliably determine what lighting scene to copy to what room (i.e. it might be difficult to determine the source and destination rooms for the follow me behavior), as the presence of both users will be detected which could be in different environments (e.g. different rooms of a house). In this case, user identification or other means of identification will be required such as the methods mentioned above using cameras or RF beacons.

If the system detects that in the source room there are no additional users, it could turn off the lights in that room.

The follow me effect could additionally be triggered only during specific times of the day or as selected by the user.

In case the user is playing a dynamic effect the system could also copy the dynamic settings to the new room. This could happen in two steps:
1. If the system detects that the user has entered the new room it will first transition to the previous light scene without dynamics.
2. If after that the system detects that the user remains in the room, it can continue to play a dynamic effect from the previous room.

In embodiments, the user is able to configure one or all of the type of the second environment (e.g. whether the second environment is a valid or invalid scene area), the threshold duration (e.g. how long the user 309 must remain in the second environment 203 before the follow me behavior is enacted), the threshold speed (e.g. how slow the user 309 must be moving before the controller 400 determines they are sufficiently at rest in the second environment 203 to enact the follow me behavior), or the threshold amount of motion (e.g. how little the user 309 must be moving within the second environment 203 before the controller 400 determines they are sufficiently at rest in the second environment 203 to enact the follow me behavior). This configuration may be performed by the user 309 by using the user device 311 to update the values of the parameters mentioned above as used by the controller 400 in methods disclosed herein.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling a lighting system to provide a follow me lighting effect from a source room to a destination room, the method comprising:
    receiving a user input from a user;
    controlling a first plurality of luminaires in the source room to render a lighting scene in response to the received user input;
    storing at least one parameter of the lighting scene in electronic storage;
    detecting a presence of the use in the destination room and in response thereto:
    determining whether the destination room exhibits follow-me behavior or not;
    determining whether the duration of the presence of the user in the destination room exceeds a threshold duration; and
    using the stored parameter to control a second plurality of luminaires in the destination room to render a version of the lighting scene on condition that the destination room exhibits follow-me behavior and that the duration of the presence of the user exceeds the duration threshold.

2. The method according to claim 1, wherein the threshold duration is configured by the user.

3. A non-transitory computer readable medium comprising code configured so as when executed on one or more processors, implements the method of claim 1.

4. The method according to claim 1, further comprising,:
    determining whether at least one property of the presence of the user in the destination room meets one or more criteria; and wherein said controlling the second plurality of luminaires is performed on further condition that the at least one property of the presence of the user in the second environment is determined to meet the one or more criteria.

5. The method according to claim 4, wherein said at least one property of the presence of the user in the destination room comprises a speed of the user within the destination room, and wherein said one or more criteria comprise a criterion being that the speed of the user is below a predetermined threshold speed.

6. The method according to claim 4, wherein said at least one property of the presence of the user in the destination room comprises an amount of motion of the user within the destination room, and wherein said one or more criteria comprise a criterion being that the amount of motion of the user (309) is below a predetermined threshold amount of motion.

7. The method according to claim 1, further comprising:
    determining a first ID being an ID of the user from whom the user input is received;
    determining a second ID being an ID of the user whose presence is detected in the destination room;
    determining whether the second ID matches the first ID; and wherein said controlling the second plurality of luminaires is performed on further condition that the second ID is determined to match the first ID.

8. The method according to claim 1, further comprising controlling the first plurality of luminaires to turn off in response to said detecting a presence of the user in the destination room.

9. The method according to claim 1, wherein the destination room exhibiting follow-me behavior or not is configured by the user.

10. The method according to claim 6, wherein the threshold amount of motion is configured by the user.

11. The method according to claim 5, wherein the threshold speed is configured by the user.

12. A lighting system for providing a follow me lighting effect from a source room to a destination room comprising:
    a first plurality of luminaires arranged to provide illumination in the source room;
    a second plurality of luminaires arranged to provide illumination in the destination room; and
    a controller arranged for:
        receiving a user input from a user;
        controlling the first plurality of luminaires render a lighting scene in response to the received user input;
        storing at least one parameter of the lighting scene in electronic storage;
        detecting a presence of the user in the destination room and in response thereto:
        determined whether the destination room exhibits follow-me behavior or not;
        determining whether the duration of the presence of the user in the destination room exceeds a threshold duration; and
        using the stored parameter to control the second plurality of luminaires to render a version of the lighting scene on condition that the destination room exhibits follow-me behavior and that the duration of the presence of the user exceeds the duration threshold.

* * * * *